Figure 3:
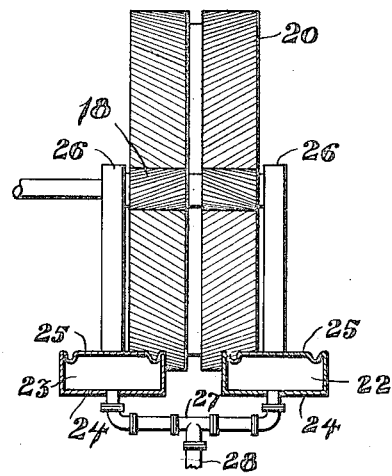

June 12, 1923.
D. C. DAVIS
1,458,131
PRESSURE DISTRIBUTING DEVICE FOR DOUBLE PINION DRIVES
Filed May 12, 1921   2 Sheets-Sheet 1
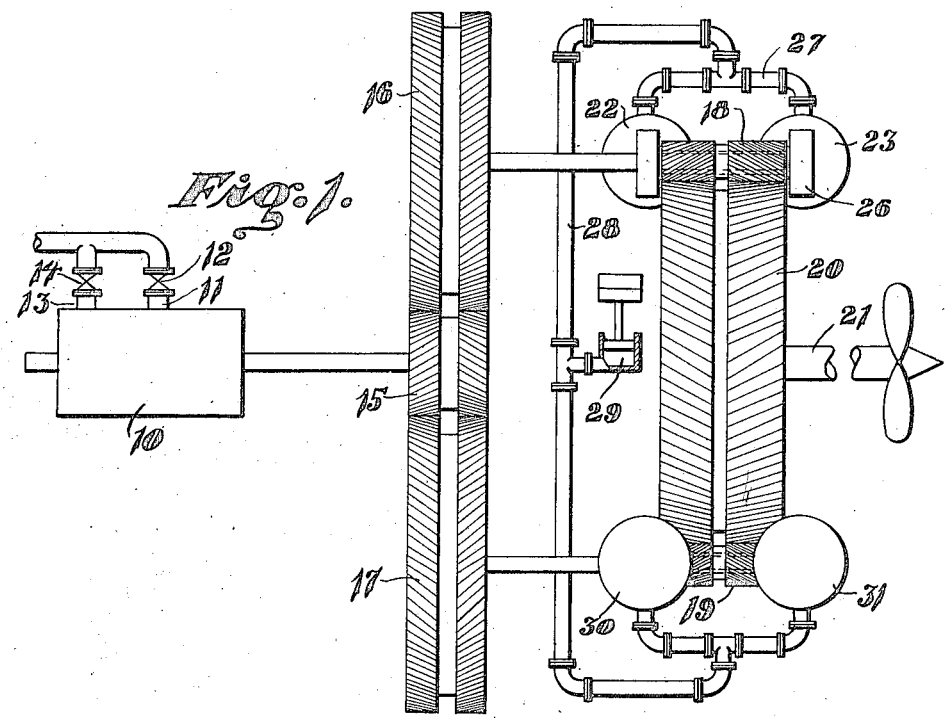
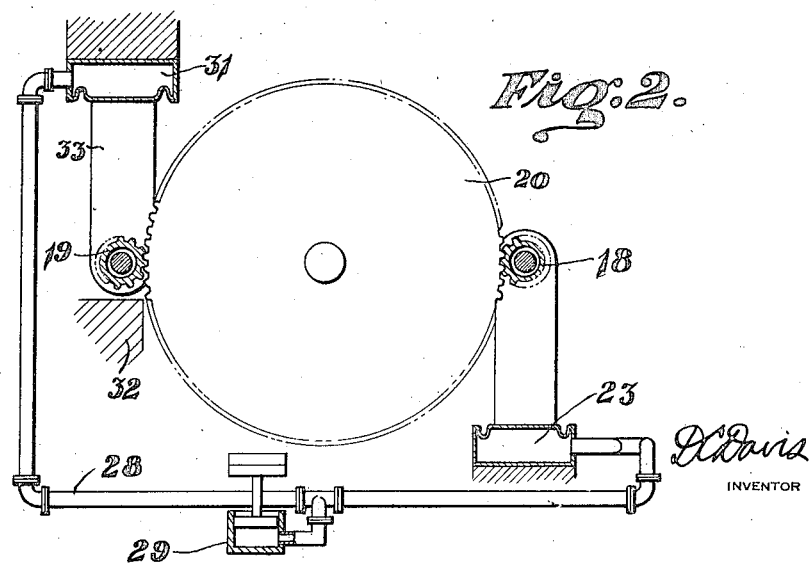

June 12, 1923.  1,458,131
D. C. DAVIS
PRESSURE DISTRIBUTING DEVICE FOR DOUBLE PINION DRIVES
Filed May 12, 1921    2 Sheets-Sheet 2

INVENTOR

Patented June 12, 1923.

1,458,131

UNITED STATES PATENT OFFICE.

DAVID C. DAVIS, OF CHESTER, PENNSYLVANIA, ASSIGNOR TO WESTINGHOUSE GEAR AND DYNAMOMETER COMPANY, A CORPORATION OF PENNSYLVANIA.

PRESSURE-DISTRIBUTING DEVICE FOR DOUBLE-PINION DRIVES.

Application filed May 12, 1921. Serial No. 469,014.

*To all whom it may concern:*

Be it known that I, DAVID C. DAVIS, a citizen of the United States, and a resident of Chester, in the county of Delaware and State of Pennsylvania, have invented a new and useful Improvement in Pressure-Distributing Devices for Double-Pinion Drives, of which the following is a specification.

My invention relates to transmission gearing of the type in which the gear train is divided and subsequently reunited, and it has for its object to provide apparatus of the character designated which shall maintain a predetermined load distribution between the two branches of the gearing train, thus eliminating undue wear and breakage of the gears in any one branch because of undue load imposed thereupon.

A further object of my invention is to provide apparatus whereby in a transmission gearing of the character designated, the load shall be divided in a predetermined ratio with one direction of rotation and shall be carried substantially entirely by one of said branches with a reverse direction of rotation.

In the accompanying drawing, I show a diagrammatic plan view of a reduction gearing as employed in ship propulsion in Figure 1; and Figures 2 and 3 are respectively partial end and partial side views of the apparatus shown in Figure 1.

In large gear transmission systems, as are commonly used for reducing the relatively high speed of a steam turbine to the relatively low speed of the ordinary ship propeller, it is common practice to divide the gearing into two trains and to subsequently reunite at the propeller shaft gear, thus distributing the relatively heavy thrusts and tooth pressures encountered in systems of this character. Difficulty has been encountered in properly dividing the load between the branches of a gearing system of this type, and in the event that the load is imposed upon any one branch there is liability of excessive tooth wear, if not actual breakage.

In United States Patent 1,136,072 issued to the Westinghouse Gear & Dynamometer Company on April 20, 1915, on an application filed by George Westinghouse, there is illustrated and claimed a gearing system wherein a driving pinion is carried by fluid-actuated supporting means, permitting the pinion to rotate with respect to the driven gear in the common plane of tangency, this effect being produced by placing a flat piston under each end of the pinion, and in closing and connecting the spaces under said piston through a conduit to which oil or other fluid is supplied under pressure. In this manner, the loads carried by the two halves of a pinion of the opposed helical type may be divided equally or in any other desired ratio, with desirable operating results.

In accordance with the present invention, I provide an extension of the above inventive idea, in that two driving pinions of either the single or double helical type and meshing with a common gear are each provided with fluid-actuated supported means and the fluid conduits of the two supporting means are connected by pressure-transmitting means, so that the tooth pressures and tangential thrusts of the two pinions or driving gears may be equalized, or otherwise adjusted, so as to maintain proper load distribution between the two or more branches of a gearing system of the character designated.

In the case of a propulsion system subject to reversal, I may duplicate the above arrangement to take care of tooth pressures and tangential thrusts developed with a reverse direction of rotation, but inasmuch as the power transmitted when the ship is running astern is generally far less than half that transmitted when the ship is running ahead, the load may well be taken by one branch of the reduction gearing and thus I may provide fixed means for absorbing the tooth pressure and tangential thrusts of a single driving pinion, thus freeing the other branch of the transmission gearing from load during astern operation.

Referring to the drawing for a more detailed understanding of my invention, I show a driving turbine or other prime mover at 10 in Figure 1, the turbine being indicated as of the double flow type with a centrally disposed steam supply 11 under the control of a valve 12 and with an astern section supply conduit 13 under the control of a valve 14.

Power developed by the turbine 10 is transmitted to a driving gear 15, preferably of the double-opposed helical type and meshing with two relatively large driving gears 16 and 17. The gear 16 in turn drives a pinion 18 of the double helical type and, in like manner, the gear 17 drives a pinion 19, the pinions 18 and 19 meshing with a common gear 20 connected to a propeller shaft 21. The connection between the gear 16 and the pinion 18 and that between the gear 17 and the pinion 19 are preferably what is known as the quill type, a relatively resilient shaft being used and the pinions being hollowed out so that the shaft extends therethrough and is attached thereto at the further end, thus imparting considerable resiliency to the driving structure.

The ends of the pinion 18 are journaled on the fluid pressure devices 22 and 23, as more clearly shown in Figure 3. Each fluid pressure device comprises a relatively rigid chamber 24 having a resilient diaphragm 25 attached thereto as a cover, these diaphragms being corrugated to impart greater resiliency thereto. The bearing members 26 at the ends of the pinion 18 are mounted on and carried by the diaphragm 25, 25. The spaces within the members 22 and 23 are connected by a suitable conduit 27 and oil is supplied thereto under pressure through a conduit 28 from a suitable accumulator indicated at 29.

In like manner, the pinion 19 is supported by pressure-actuated devices 30 and 31, the latter being mounted above the pinion 19, whereas the devices 22 and 23 are mounted under the pinion 18, all as clearly indicated in Figure 2, it being obvious that with a clockwise rotation of the gear 20, there is developed a downward tooth pressure or tangential thrust at the pinion 18 and an upward tooth pressure or tangential thrust at the pinion 19.

The conduit 28 also communicates with the interior of the devices 30 and 31 so that the same fluid pressure is exerted at all times in all four devices 22, 23, 30 and 31. In the event that the diaphragms of these four devices have equal areas, the tooth pressures and tangential thrusts in both halves of both pinions are at all times equalized, when driving in the direction indicated in Figure 2, and by suitable proportioning of the areas of the respective diaphragms, any desired adjustment of the tooth pressures and pinion loads may be secured.

When driving in the reverse direction, as when a ship is going astern, it will be obvious that the tooth pressure reaction or tangential thrust of the pinion 19 will be downward, whereas that of the pinion 18 will be upward, and, if desired, the devices 22, 23, 30 and 31 may be duplicated on the opposite sides of the respective pinions although, in certain cases, this is an unnecessary complication and expense for the following reasons:

The astern horse-power commonly employed is materially less than half the full horse-power ahead and consequently may be transmitted by a single branch of the reduction gearing. I may, therefore, place a fixed stop 32 beneath the journal members 33 of the pinion 19, astern driving causing the members 33 to abut against the member 32 so that the driving load is carried by the gear 17 and the pinion 19.

In the following claims, the two pressure devices supporting a given pinion may be considered as forming a single pinion supporting structure, the total pressures exerted at the respective pinions being equalized or otherwise distributed.

While I have shown my invention in a plurality of forms, it will be obvious to those skilled in the art that it is not so limited, but is susceptible of various other changes and modifications without departing from the spirit thereof, and I desire, therefore, that only such limitations shall be placed thereupon as are imposed by the prior art or as are specifically set forth in the appended claims.

What I claim is:

1. In a transmission gearing, the combination with a divided and reunited gearing train, of a plurality of fluid-actuated supporting devices, one for a gear in each branch of said train, and fluid-pressure transmitting means between said supporting devices to maintain a predetermined ratio between the thrusts exerted thereby.

2. In a transmission gearing, the combination with a divided and reunited gearing train, of a plurality of fluid-actuated supporting devices, one for a gear in each branch of said train, and fluid-pressure transmitting means between said supporting devices to equalize the tangential thrusts exerted thereby.

3. In a transmission gearing, the combination with a divided and reunited gearing train terminating in two driving gears meshing with a common driven gear, of a fluid-actuated supporting device for each of said driving gears, and fluid-pressure transmitting means between said supporting devices for maintaining a predetermined ratio between the tangential thrusts exerted thereby.

4. In a transmission gearing, the combination with a divided and reunited gearing train terminating in two driving gears meshing with a common driven gear, of a fluid-actuated supporting device for each of said driving gears, and fluid-pressure transmitting means between supporting devices for equalizing the tangential thrusts exerted thereby.

5. In a transmission gearing, the combination with a driven gear of the double helical type, of two driving gears of the double helical type meshing therewith, fluid actuated supporting means for each driving gear and effective in a direction substantially parallel with the tangent plane of the pinion and the gear, and a conduit for fluid between said two supporting means for maintaining a predetermined ratio between the tangential thrusts exerted by the two supporting means.

6. In a transmission gearing, the combination with a driven gear of the double helical type, of two driving gears of the double helical type meshing therewith, fluid actuated supporting means for each driving gear permitting relative angular motion between each driving gear and said driven gear in the respective planes of tangency, and a fluid conduit between said two supporting means for equalizing the tangential thrusts exerted by the two supporting means.

7. In a gearing device, a gear, two pinions meshing therewith, a fluid-actuated supporting device for each pinion constructed so as to allow relative angular motion between each pinion and said gear in the respective planes of tangency, and a pressure transmitting device between said two supporting devices for maintaining a predetermined ratio between the tangential thrusts exerted thereby.

8. In a gearing device, a gear, two pinions meshing therewith, a fluid-actuated supporting device for each pinion constructed so as to allow relative angular motion between each pinion and said gear in the respective planes of tangency, and a pressure transmitting device between said two supporting devices for equalizing the tangential thrusts exerted thereby.

9. In a reduction gear, the combination of a plurality of driving pinions, a driven gear meshing with the pinions, bearings for supporting the ends of the pinions, a fluid-pressure supporting device for each of the bearings, pressure-equalizing connections between the fluid-pressure supporting devices of the bearings of each pinion, and other pressure-equalizing connections between the pinion bearing equalizing connections.

10. The combination with a double reduction gear including driving, driven, and intermediate gear and pinion members of the opposed helical type, of means for assuring the distribution of load between the sets of intermediate gear and pinion members and the balancing of tooth pressures including fluid-pressure devices for supporting the intermediate pinion members, an equalizing connection for the devices of each pinion member, and a second equalizing connection for the first equalizing connections.

11. In a gearing device, the combination with two driving gears having mechanically interconnected engaging means, of a common driven gear meshing with each of said driving gears, a fluid-pressure device disposed adjacent each end of each of said driving gears to take the tangential thrust exerted thereat, and fluid-pressure transmitting means between said fluid-pressure devices for maintaining a predetermined ratio between the respective thrusts.

12. In a gearing device, the combination with two driving gears having mechanically inter-connected engaging means, of a common driven gear meshing with each of said driving gears, a fluid-pressure device disposed adjacent each end of said driving gear to take the tangential thrust exerted thereat, and fluid-pressure transmitting means between said fluid pressure devices for equalizing the respective thrusts.

13. In a transmission gearing, the combination with a driving gear, reversible driving means for said driving gear, fluid-actuated supporting means for taking the tangential load thrust of one set of said gears with one direction of rotation and fixed means for taking the tangential load thrust of said gear with the other direction of rotation.

14. In a transmission gearing, the combination with a driven gear, of two driving gears in turn driven by mechanically interconnected reversible driving means and means whereby, with one direction of rotation, the load imparted to said driven gear is divided between said driving gears in a predetermined ratio and whereby, with the other direction of rotation, substantially the entire driving load is taken by one driving gear.

15. In a transmission gearing, the combination with a driven gear, of two driving gears meshing therewith and in turn driven by mechanically interconnected reversible driving means and means whereby, with one direction of rotation, the load imparted to said driven gear is equalized between said driving gears, and whereby with the other direction of rotation, substantially the entire driving load is taken by one driving gear.

16. In a transmission gearing, the combination with a driven gear, of two driving gears meshing therewith and, in turn, deriving their driving effort from a common source, a fluid-actuated supporting device for each of said driving gears, together with a pressure-transmitting connection therebetween, adapted to absorb the tangential thrusts of said driving gears with one direction of rotation and to maintain a predetermined ratio between the respective thrusts, and fixed means for absorbing the tangential thrust of one of said gears with the other direction of rotation.

17. In a transmission gearing, the combination with a driven gear, of two driving gears meshing therewith and, in turn, deriving their driving effort from a common source, a fluid-actuated supporting device for each of said driving gears, together with a pressure-transmitting connection therebetween, adapted to equalize and absorb the tangential thrusts of said driving gears with one direction of rotation, and fixed means for absorbing the tangential thrust of one of said gears with the other direction of rotation.

In testimony whereof, I have hereunto subscribed my name this 29 day of April, 1921.

DAVID C. DAVIS.